United States Patent [19]

Kaminski

[11] Patent Number: 4,853,169
[45] Date of Patent: Aug. 1, 1989

[54] METHOD FOR APPLYING LABELS TO BLOW MOLDED ARTICLES

[75] Inventor: Ronald S. Kaminski, Bowling Green, Ohio

[73] Assignee: Owens-Illinois Plastic Products Inc., Toledo, Ohio

[21] Appl. No.: 63,643

[22] Filed: Jun. 22, 1987

[51] Int. Cl.$^4$ .............................................. B29C 43/22
[52] U.S. Cl. .................................. 264/509; 425/126.1; 425/504; 425/540; 156/521; 156/566; 156/261
[58] Field of Search ..................... 264/509; 425/126 R, 425/504, 540, 126.1; 156/566, 351, 355, 521, 261, 217, 517, 252, 256; 83/155

[56] References Cited

U.S. PATENT DOCUMENTS

| | | | |
|---|---|---|---|
| 3,915,785 | 10/1975 | Müller | 156/566 |
| 4,332,635 | 6/1982 | Holbrook et al. | 156/267 |
| 4,636,166 | 1/1987 | Franks et al. | 425/522 |
| 4,680,000 | 7/1987 | Nowicki et al. | 425/504 |

Primary Examiner—Jan H. Silbaugh
Assistant Examiner—Neil M. McCarthy

[57] ABSTRACT

In the method of making hollow plastic articles wherein a label is positioned in each of a plurality of spaced partible molds in a predetermined array, preforms are positioned in each set of partible molds and the molds are closed and the preforms are blown outwardly to the confines of the molds to apply the label to the resultant hollow plastic article, the method which comprises providing labels on a roll of labels, successively die cutting the labels from the web of the roll and simultaneously delivering each label directly to an endless vacuum conveyor, indexing the endless vacuum conveyor to provide an array of labels on the conveyor which corresponds in spacing to the spacing of the array of molds, engaging the array of labels on the conveyor and removing them from the conveyor and depositing the array of labels in the array of molds.

3 Claims, 4 Drawing Sheets

METHOD FOR APPLYING LABELS TO BLOW MOLDED ARTICLES

This invention relates to the application of labels to hollow blown articles.

BACKGROUND AND SUMMARY OF THE INVENTION

In the making of hollow blown plastic articles such as containers, it has heretofore been suggested that labels be held in one or more of the mold sections by vacuum so that when the parison is blown outwardly into conformity with the cavity, the label becomes adhered or bonded to the article.

The molds are often provided in a plurality of sets of partible molds in a predetermined array and, in order to delivery the labels, a plurality of magazines are provided, one for each mold half, and an associated plurality of pick-up and delivery devices function to remove labels from the magazines and deliver them to one or both of the mold halves of each set.

As set forth in U.S. Pat. No. 4,636,166, having a common assignee with the present application, an apparatus is provided wherein labels are successively removed from a label magazine and positioned in an array which corresponds in spacing to the spacing of the sets of molds. The labels are then simultaneously moved in the array from the first position to a second position within the open partible molds and deposited in the molds. The apparatus comprises a magazine for supporting labels in a stack and an endless belt transfer device positioned adjacent the magazine. The belt is indexed in predetermined spaces corresponding to the spaces of the array of molds. A label pick-up device removes a label from the magazine and deposits it on the conveyor so that the spacing between the labels on the endless transfer conveyor corresponds to the spacing between the sets of molds. Another label deposit device removes the labels simultaneously from the endless transfer conveyor and delivers them between the open partible molds.

Where labels are to be cut from a roll of labels, problems arise because the free end of labels tends to move so that when a label is cut from the roll, the cut may not be square. These conditions are aggravated when the labels are made of plastic.

In co-pending application Ser. No. 802,117 filed Nov. 25, 1985, and now U.S. Pat. No. 4,680,000, having a common assignee with the present application, there is disclosed a method and apparatus for applying labels in the molds of a plastic blow molding machine of the type wherein a plurality of sets of molds are mounted on a wheel rotatable about a horizontal axis and the molds are moved toward and away from one another to enclose a parison and the parison is then blown to the confines of the cavity between the mold sections which comprises removing labels successively from one or more magazines, depositing the labels on an endless conveyor which transports the labels to a position adjacent an open mold and laterally transferring the labels from the conveyor to a position within the molds such that when a mold closes about a plastic parison and the parison is blown, the labels become adhered to the blown plastic bottle.

The use of magazines inherently produces problems. Among these are the cost of magazines, the need to replenish the supply of labels in the magazines and the space required about the container forming machine. In addition, when plastic or foam labels are being handled, they are difficult to stack and handle for placement in the magazines. If the labels are cut from a web and stacked it is difficult to ascertain whether they are in proper registry. If the shape of the plastic or foam label is complex, the magazines are more complex. After being formed, the plastic or foam labels must be handled in batches or stacks that are not easily handled.

Among the objectives of the present invention are to provide a method of applying an array of labels between partible molds which eliminates the need for label magazines; which can be used to apply labels of different materials such as paper, plastic and foam; which can be utilized in applying labels to both sections of partible molds providing two labels to each mold cavity and which minimizes the manipulative steps and lessens the possibilities of error in positioning the labels in an array.

In accordance with the invention, the method comprises providing labels on a roll of labels, successively die cutting the labels from the web of the roll and simultaneously delivering each label directly to an endless vacuum conveyor, indexing the endless vacuum conveyor to provide an array of labels on the conveyor which corresponds in spacing to the spacing of the array of molds, engaging the array of labels on the conveyor and removing them from the conveyor and depositing the array of labels in the array of molds.

DESCRIPTION

Figure 1:
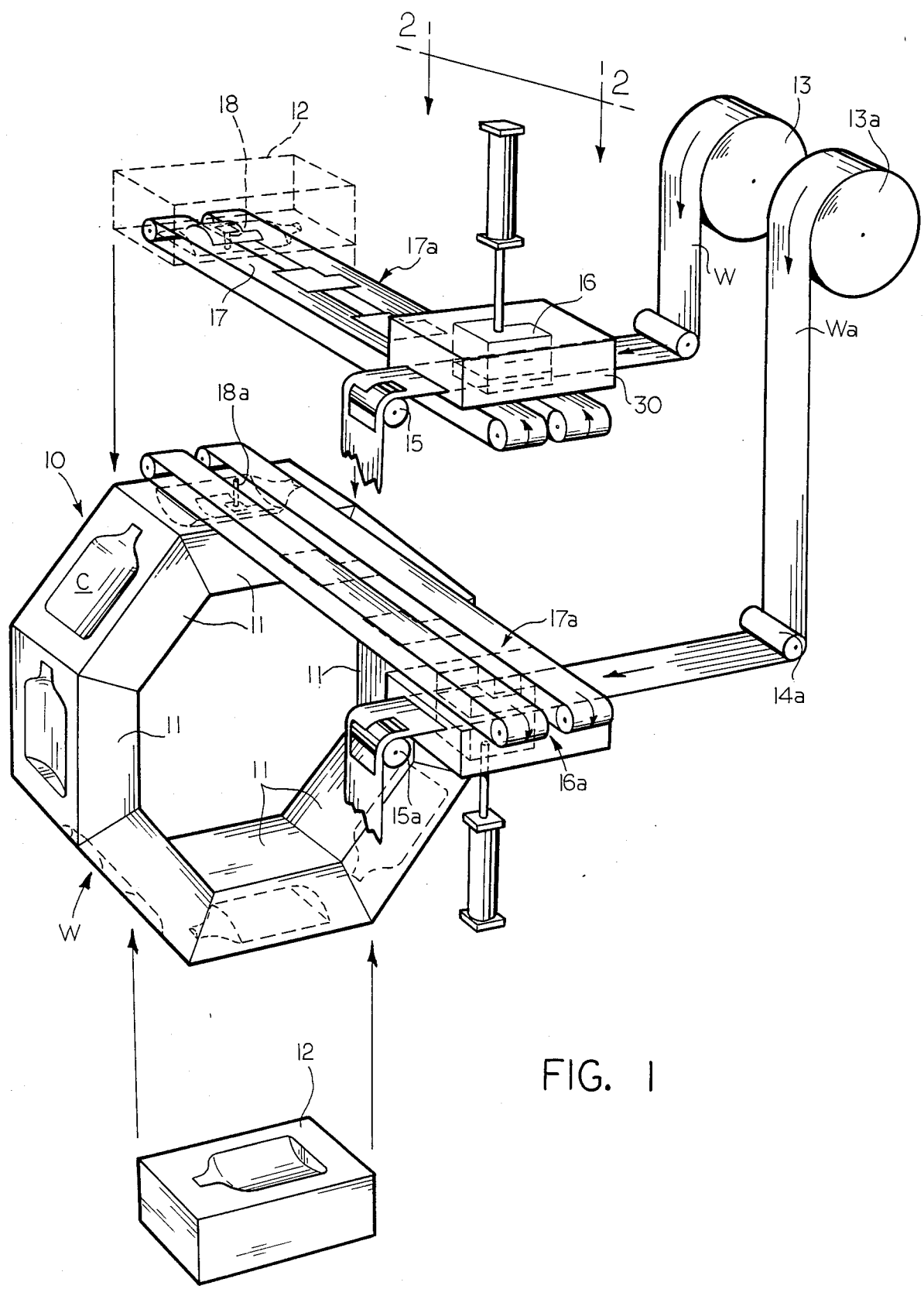
FIG. 1 is a perspective partly schematic view of an apparatus for performing the method of the invention.
Figure 2:
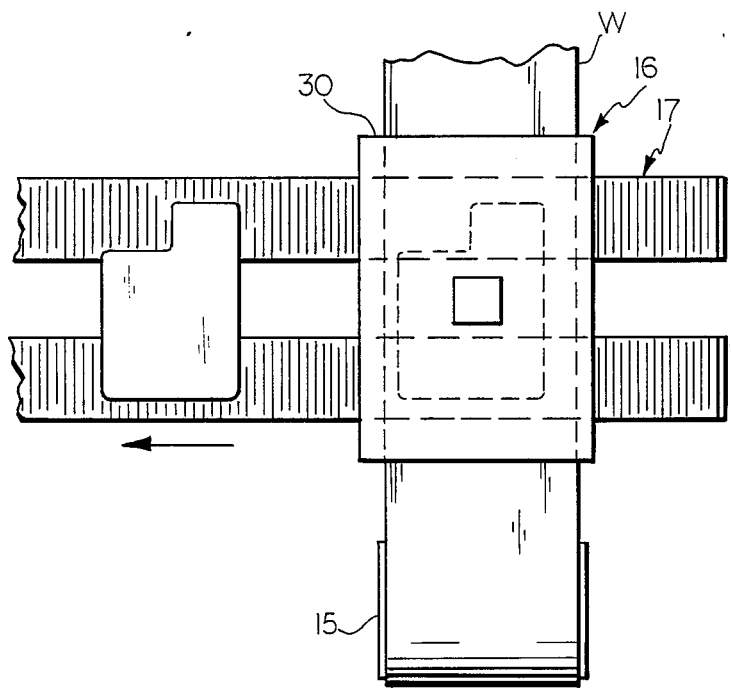
FIG. 2 is a fragmentary plan view taken in the direction of the arrow 2 in FIG. 1.
Figure 3:
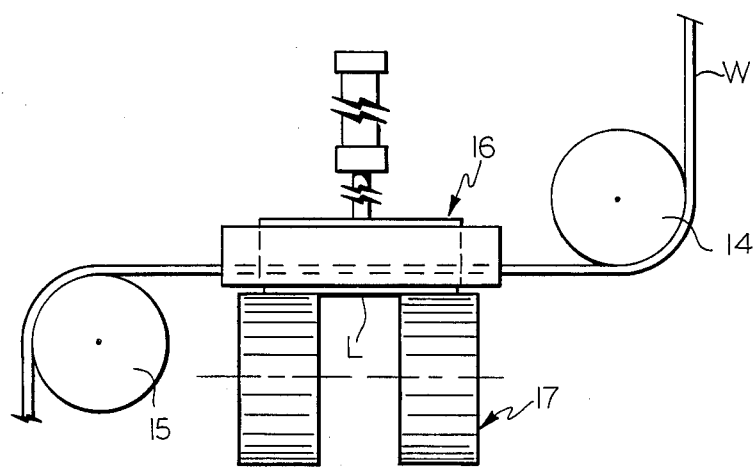
FIG. 3 is a side elevational view taken from the right in FIG. 2.
Figure 4:
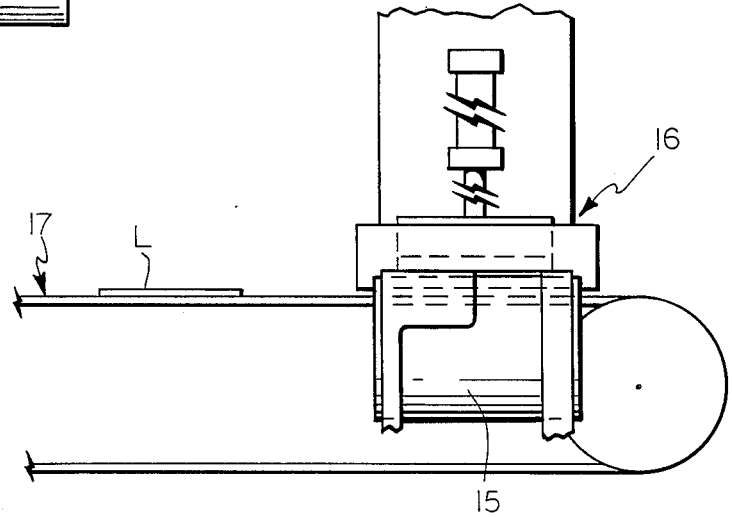
FIG. 4 is a front elevational view of FIG. 2.

Referring to FIGS. 1-4, the invention relates to blow molded plastic articles such as containers wherein labels are applied to sections of a set of molds and the mold sections are closed and heated about heated parisons or preforms and the preforms are blown outwardly in the conformity with the mold sections causing the labels to be adhered or bonded to the blown articles.

As shown in FIGS. 1-4, the invention is shown as being applied to a method wherein the invention is particularly applicable to a blow molding apparatus comprising a wheel 10 which is mounted on a shaft extending horizontally for rotation on a frame (not shown) and a plurality of sets of molds are provided in circumferentially spaced relation about the wheel 10. Each set comprises a pair of mold sections, a first mold section 11 being mounted on the hub and a second mold section 12 being mounted in radial alignment with the first mold section 11 to open and close the mold. As the wheel 10 rotates, where the molds are open, an extruder (not shown) delivers a parison between an open mold so that when the mold is closed, the parison can be blown to form the hollow article such as a container. After blowing, the hollow articles are removed. The blow molding apparatus is more fully shown in U.S. Pats.

Nos. 4,523,904 and 4,549,865, which are incorproated herein by reference.

The apparatus is shown for delivering two labels, one to the cavity of each mold section 11, 12 and comprises a base 36 which supports a conveyor 15. The conveyors 17, 17a deliver the labels successively to a point adjacent the open mold sections 11, 12 and a label placement mechanism 18, 18a associated with each label mechanism 18, 18a operates to remove the label and deliver it to its respective mold section 10, 11. The aforementioned application Ser. No. 802,117 is incorporated herein by reference for details of the conveyor and delivery apparatus.

In accordance with the invention, rolls 13, 13a of printed labels supply webs W, Wa vertically downwardly to rolls to 14, 14a and then horizontally over rollers 15, 15a. Die cut mechanisms 16, 16a function to die cut labels from the web W, Wa and deliver them directly to endless vacuum conveyors 17, 17a. The feeding of the webs W, Wa, operation of the die cut mechanisms 16, 16a and the conveyors 17, 17a are timed to provide the labels on the conveyors 17, 17a in a predetermined spacing so that they are delivered successively to the open mold sections 11, 12. Thereafter depositing mechanisms 18, 18a function to deliver the labels to the mold sections.

Figure 5:
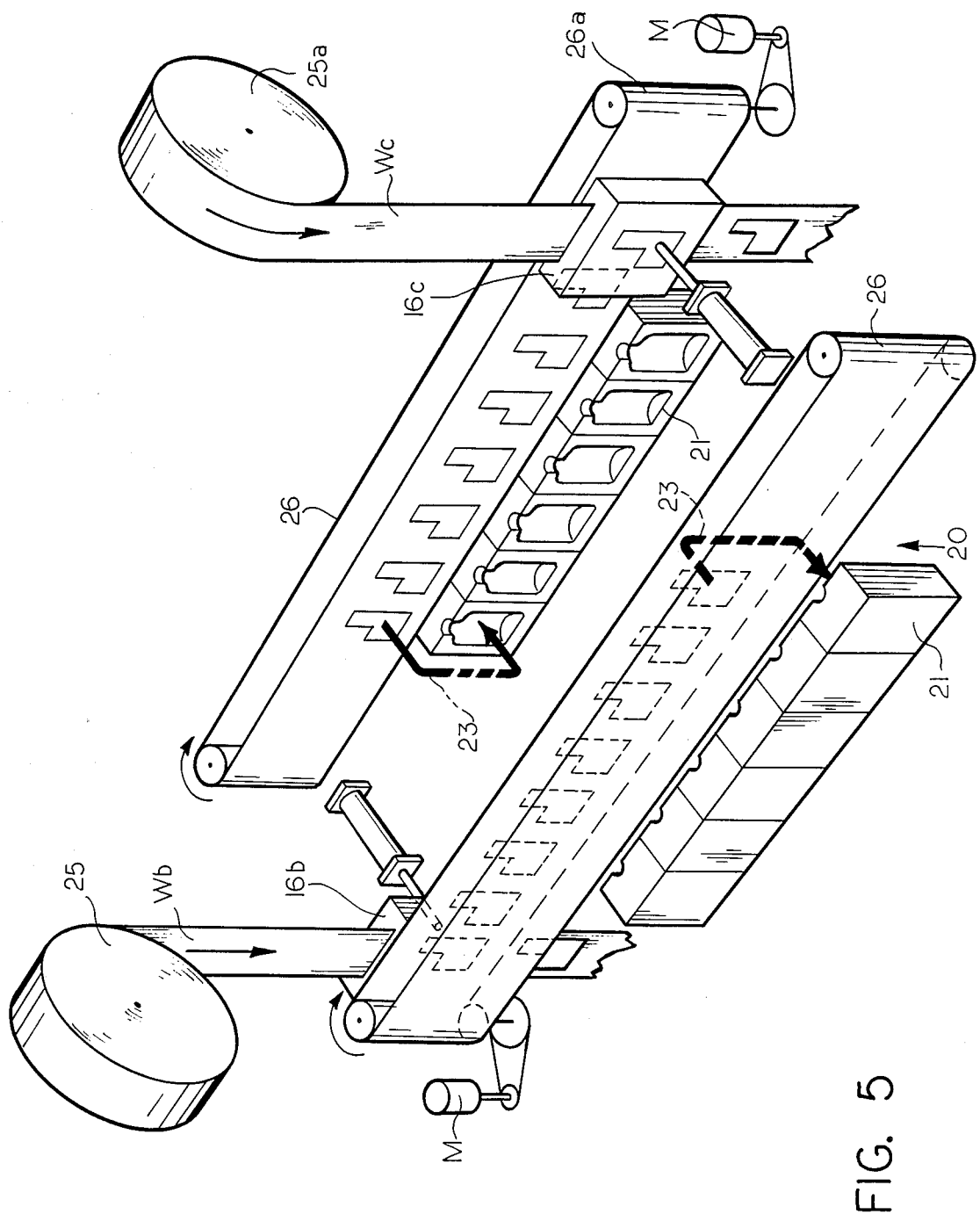
FIG. 5 is a schematic view of an apparatus for performing a modified form of the method.

In the form shown in FIG. 5, the invention is applied to an apparatus which includes a plurality of sets of partible molds 20 in a linear array, that is, in side-by-side relationship. An extruder is associated with each set of molds and a head is moved downwardly to receive the end of an extruded tube in a neck mold in the head which is then drawn upwardly to position a preform or parison between the mold sections 21. The mold sections 21 are then closed and the article blown to the desired configuration within the confines of the mold. Where a label is to be applied, the head supports label deposit devices 23 as hereinafter described which deliver labels to the mold sections. If only one label is to be applied, a single deposit device 23 is provided for each set of molds. The aforementioned U.S. Pat. No. 4,636,166 is referred to for the details of the apparatus for removing the labels from the conveyor and depositing them in the molds and is incorporated herein by reference.

In the apparatus shown in FIG. 5, rolls 25, 25a supply webs Wb, Wc having labels printed thereon downwardly adjacent endless vacuum conveyors 16b, 16c where die cut mechanisms 16b, 16c cut and deliver the labels successively to the conveyors 26 which are then indexed in time relationship to provide an array. Thereafter delivery mechanisms remove the labels from the conveyors and deposit them simultaneously in the array of the mold sections.

Figure 6:
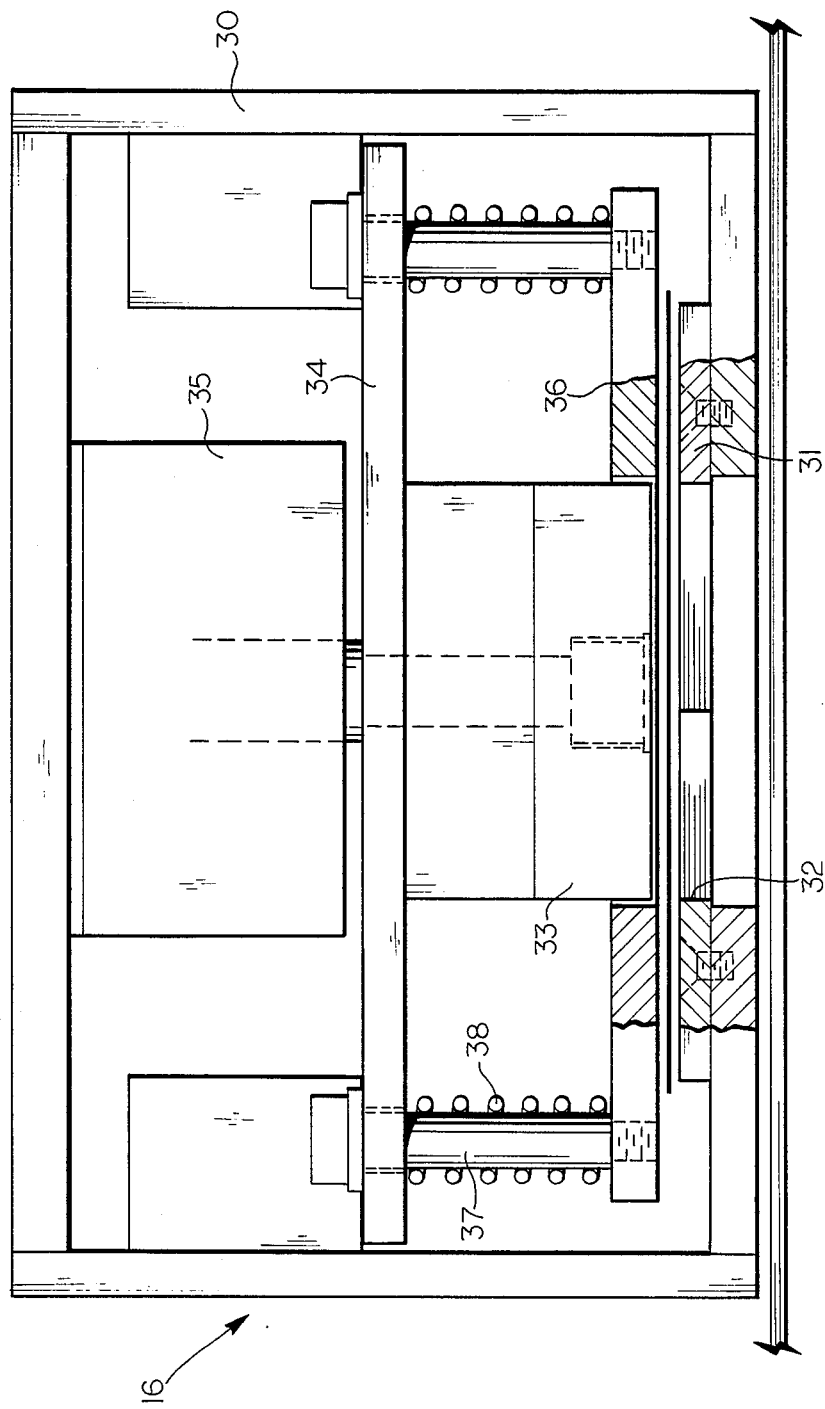
FIG. 6 is a side elevational view of a die cutting apparatus utilized in the method.

FIG. 6 shows a typical die cutting mechanism which can be used which comprises a frame 30 that supports a die 31 having an opening 32 with a cutting edge corresponding to the shape of the label L which is to be cut from the web. A punch 33 cooperates with die 32 to cut a label. Punch 33 is supported on a plate 34 which is moved by a piston of a large cylinder 35. A stripper plate 36 is mounted on a plurality of shafts 37 and is yieldingly urged downwardly by springs 38 interposed between plate 34 and stripper plate 36 to clamp the web during cutting of the label.

I claim:

1. In a method of making hollow plastic articles wherein a label is positioned in each of a plurality of sets of spaced partible molds in a predetermined array, preforms are positioned in each set of partible molds and the molds are closed and the preforms are blown outwardly to the confines of the molds to apply the label to the resultant hollow plastic article, the method of delivering the labels to the molds which comprises:

providing labels in a web of a roll of labels, moving the web of the roll of labels past a die cutting station, successively die cutting a label from the web of the roll of labels at said die cutting station by moving a punch through the web at a right angle to the web, continuing the movement of said punch at a right angle to deliver said label simultaneously directly onto an endless vacuum conveyor, indexing a remaining portion of the web which has the label die cut therefrom past the die cutting station after a label has been die cut and delivered to said conveyor, indexing the endless vacuum conveyor after each die cut to provide an array of labels on the conveyor which corresponds in spacing to the spacing of the array of molds, engaging the array of labels on the conveyor and removing them from the conveyor, and;

depositing the array of labels in one section of the array of molds.

2. The method set forth in claim 1 including the steps of:

providing labels in a web on a second roll of labels, moving the web of said second roll of labels past a second die cutting station, successively die cutting the labels from the web of the second roll of labels at said second die cutting station by moving a second punch through the web at a right angle to the web, continuing the movement of said second punch at a right angle to deliver said label simultaneously directly onto a second endless vacuum conveyor, indexing a remaining portion of the web which has the label die cut therefrom past the die cutting station after a label has been die cut and delivered to said second conveyor, indexing the second endless vacuum conveyor after each die cut to provide an array of labels on the second conveyor which corresponds in spacing to the spacing of the array of molds, engaging the array of labels on the second conveyor and removing them from the second conveyor, and;

depositing the array of labels in one section of the array of molds.

3. The method set forth in claim 2 wherein said mold sections are moved in a closed path and the mold sections are moved radially relative to one another.

* * * * *

UNITED STATES PATENT AND TRADEMARK OFFICE
CERTIFICATE OF CORRECTION

PATENT NO. : 4,853,169
DATED : August 1, 1989
INVENTOR(S) : Ronald S. Kaminski

It is certified that error appears in the above-identified patent and that said Letters Patent is hereby corrected as shown below:

Title page, item [21]:

"Appl. No.: 63,643" should be --Appl. No.: 64,643--

Signed and Sealed this

Twenty-ninth Day of May, 1990

Attest:

HARRY F. MANBECK, JR.

*Attesting Officer*            *Commissioner of Patents and Trademarks*